United States Patent [19]
Kawamura et al.

[11] Patent Number: 5,714,985
[45] Date of Patent: Feb. 3, 1998

[54] IMAGE PROCESSING SYSTEM CAPABLE OF HIGH-SPEED AND HIGH-RESOLUTION IMAGE SYNTHESIS

[75] Inventors: Naoto Kawamura; Yoshinobu Mita, both of Kawasaki; Miyuki Enokida, Yokohama; Junichi Shishizuka, Tokyo; Yoshihiro Ishida, Kawasaki, all of Japan

[73] Assignee: Canon Kabushiki Kaisha, Tokyo, Japan

[21] Appl. No.: 304,825

[22] Filed: Sep. 13, 1994

Related U.S. Application Data

[63] Continuation of Ser. No. 117,651, Sep. 8, 1993, abandoned, which is a continuation of Ser. No. 892,697, May 28, 1992, abandoned, which is a continuation of Ser. No. 386,460, Jul. 28, 1989, abandoned.

[30] Foreign Application Priority Data

Jul. 29, 1988 [JP] Japan .................. 63-189809

[51] Int. Cl.$^6$ .................................................. G09G 5/36
[52] U.S. Cl. ................................. 345/201; 395/526
[58] Field of Search ....................... 340/717, 744, 340/747, 748, 750, 798, 799; 382/44, 45, 46, 47; 364/521; 395/162, 164, 526, 508, 511, 308; 345/201

[56] References Cited

U.S. PATENT DOCUMENTS

| | | | |
|---|---|---|---|
| 3,961,324 | 6/1976 | Cousin et al. | 340/717 |
| 4,439,760 | 3/1984 | Fleming | 340/747 |
| 4,611,347 | 9/1986 | Netravali et al. | 382/38 |
| 4,839,826 | 6/1989 | Urushibata | 340/747 |
| 4,876,651 | 10/1989 | Dawson et al. | 364/521 |
| 4,954,969 | 9/1990 | Tsumura | 340/799 |

FOREIGN PATENT DOCUMENTS

| | | |
|---|---|---|
| 2551236 | 3/1985 | France . |
| 3804938 | 9/1988 | Germany . |
| 2073995 | 10/1981 | United Kingdom . |
| 2148560 | 3/1985 | United Kingdom . |

OTHER PUBLICATIONS

"Bus Extension System", in *IBM Technical Disclosure Bulletin*, vol. 26, No. 12 (May 1984), pp. 6481–6483, by Yanagi.

"Bus Controller Chip Lets Processor Board Switch Master and Slave Roles", in *Electronic Design*, vol. 32, No. 13 (Jun. 1984), pp. 243–254, by MacKenna.

"Universal CCD–Controller System", in *Review of Scientific Instruments*, vol. 57, No. 2 (Feb. 1986), pp. 253–258, by Bortoletto et al.

*Primary Examiner*—Jeffery Brier
*Attorney, Agent, or Firm*—Fitzpatrick, Cella, Harper & Scinto

[57] ABSTRACT

An image processing system, particularly for a color image, capable of various and precise image processings. For this purpose there are provided a memory for ordinary image processing, additional memories for expanding the memory capacity, and a system bus, an address bus and a high-speed transfer bus connecting these memories for enabling mutual data transfer and integrated use of said memories.

14 Claims, 11 Drawing Sheets

(Mx, My) OR (Sx, Sy)

| 1 | 2 | 1 | 2 | 1 |
|---|---|---|---|---|
| 3 | 4 | 3 | 4 | 3 |
| 1 | 2 | 1 | 2 |   |
| 3 | 4 | 3 |   |   |
| 1 |   |   |   |   |

SAME SIZE

REDUCTION

FIG. 10B

VFM                              MONITOR

| A1 | B1 |    |
|----|----|----|
| C1 | D1 |    |
|    |    |    |

→

| A1 | A1 | B1 | B1 |
|----|----|----|----|
| A1 | A1 | B1 | B1 |
| C1 | C1 | D1 | D1 |
| C1 | C1 | D1 | D1 |

TRANSFER OF "1"

FIG. 11A

| A1 | A2 | B1 | B2 |
|----|----|----|----|
| C1 | C2 | D1 | D2 |
|    |    |    |    |

→

| A1 | A2 | B1 | B2 |
|----|----|----|----|
| A1 | A2 | B1 | B2 |
| C1 | C2 | D1 | D2 |
| C1 | C2 | D1 | D2 |

TRANSFER OF "2"

FIG. 11B

| A1 | A2 | B1 | B2 |
|----|----|----|----|
| A3 |    | B3 |    |
| C1 | C2 | D1 | D2 |
| C3 |    | D3 |    |

→

| A1 | A2 | B1 | B2 |
|----|----|----|----|
| A3 | A3 | B3 | B3 |
| C1 | C2 | D1 | D2 |
| C3 | C3 | D3 | D3 |

TRANSFER OF "3"

FIG. 11C

| ADDRESS CALCULATION | DATA CALCULATION |
|---|---|
| · DMA TRANSFER | NONE |
| · ENLARGEMENT / REDUCTION | INTERPOLATION |
| · ROTATION (ARBITRARY ANGLE) | INTERPOLATION |
| · RASTER ACCESS | SPACE FILTER; AND/OR OPERATION |
| · MIRROR IMAGE / INCLINATION | |

IMAGE PROCESSING SYSTEM CAPABLE OF HIGH-SPEED AND HIGH-RESOLUTION IMAGE SYNTHESIS

This application is a continuation of application Ser. No. 08/117,651 filed Sep. 8, 1993, now abandoned, which was a continuation of application Ser. No. 07/892,697 filed May 28, 1992, now abandoned, which was a continuation of application Ser. No. 07/386,460 filed Jul. 28, 1989, now abandoned.

BACKGROUND OF THE INVENTION

1. Field of the Invention

The present invention relates to an image processing system, and more particularly to an image processing system for a color image.

2. Related Background Art

Among conventional color image processing systems, there are already known small-scale systems, capable of handling images up to about 512×512 pixels and composed of a memory board or a processor connected to a commercially available personal computer.

There are also known larger systems for finer images, capable of considerably advanced image processings and of handling larger images. Furthermore there are known very large systems, for example employed in the printing industry, with image size and processing speed adequate for professional use.

However, such conventional system have been associated with the following drawbacks.

The small system of the personal computer level only has an image memory of the order of 512×512 pixels for direct processing by the CPU, and can only process images of low resolution with limited data per pixel.

On the other hand, the larger system for finer images has been associated with a slow processing speed and poor operability, partly resulting from insufficient ability of the CPU and increased amount of image data.

Also, the very large professional system is very expensive and requires a professional operator.

Furthermore, in all these system, the system is dependent on the available image memory size, and the processible image size is thus limited.

SUMMARY OF THE INVENTION

An object of the present invention is to provide an image processing system capable of various image processings and processing of fine quality images by adding a large-capacity memory, when necessary, to the image memory for ordinary image processing, and capable of increasing the processing speed by connecting the address calculator or the data calculator to these memories.

Another object of the present invention is to provide an image processing system capable of improving the operability and the dialogue performance, by improving the efficiency of image transfer to or from image input/output devices such as a monitor, a scanner or a printer, through the use of plural buses and a high-speed transfer bus for image display or image input.

BRIEF DESCRIPTION OF THE DRAWINGS

FIGS. 10(a) and 10(b) are schematic views showing the principle of progressive transfer between the memories IM and VFM;

FIGS. 11(A), 11(B) and 11(C) are schematic views showing the principle of progressive mode of the memory VFM;

DETAILED DESCRIPTION OF THE PREFERRED EMBODIMENTS

The present invention will now be clarified in detail by description of the preferred embodiments thereof.

Figure 1:
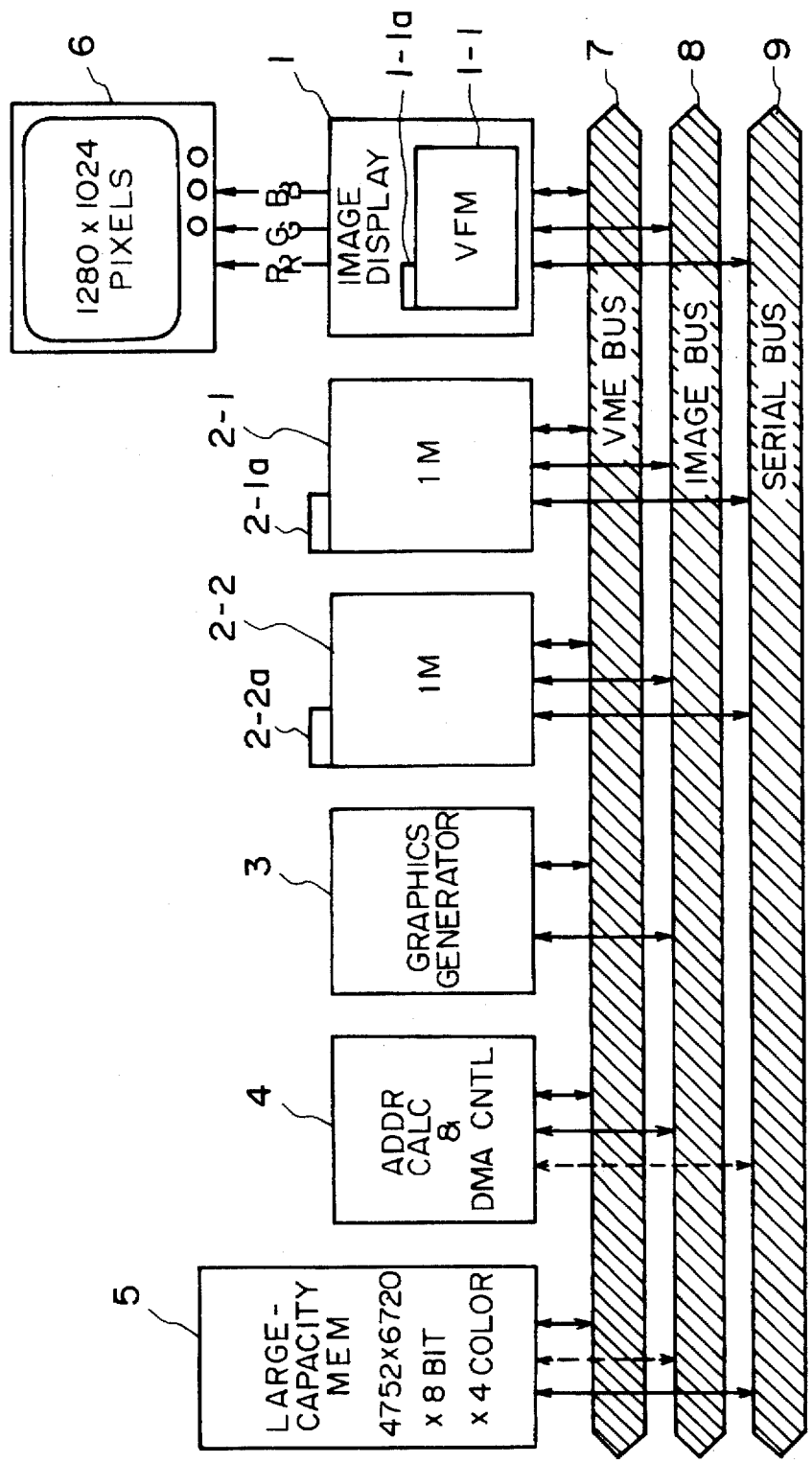
FIG. 1 is a block diagram of the system of the present invention.

FIG. 1 shows an embodiment of the present invention, wherein an image display unit 1, image memories (IM) 2-1, 2-2, a video frame memory (VFM) 1-1 for the image display unit 1, and a graphics generator 3 are all connected to a VME bus, 7, an IMAGE bus 8 and a SERIAL bus 9. The image data in the image memories 2-1, 2-2 can be displayed, by transfer to the video frame memory 1-1, on a monitor 6 of for example 1280×1024 pixels. The graphics generator 3 can record image data in the image memories 2-1, 2-2 or the video frame memory 1-1, through the image bus 8.

Figure 3:
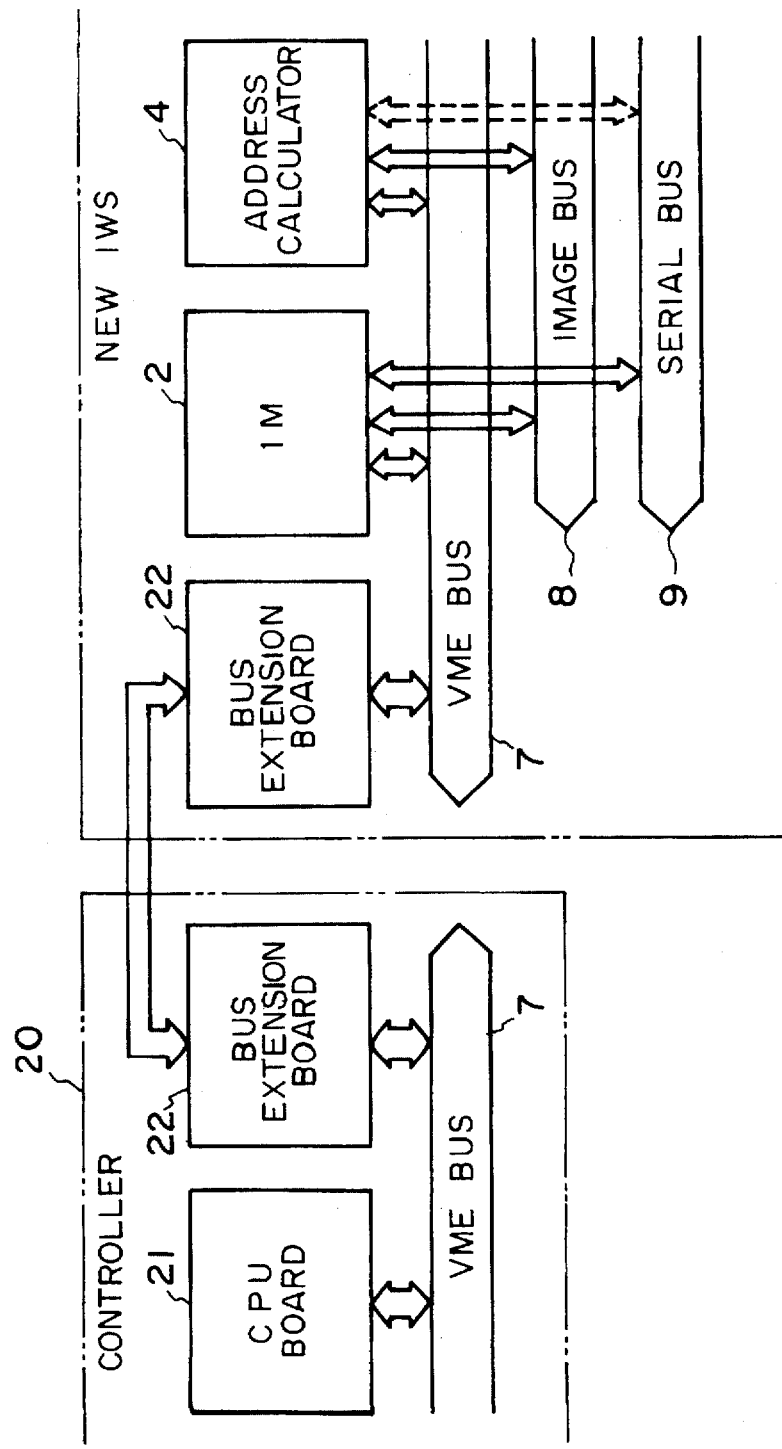
FIG. 3 is a block diagram showing the connection with a control unit.

The basic bus structure of the present system is composed of three buses: a main VME bus 7, an IMAGE bus 8 exclusively for image processing, and a SERIAL bus 9 for high-speed image data transfer. The VME bus may be composed of a general-purpose CPU (system) bus. As shown in FIG. 3, the VME bus 7 is connected to a controller (computer system) 20, and the image memories 2-1, 2-2 and the video frame memory 1-1 shown in FIG. 1 are mapped in an address space directly accessible by the CPU of the controller, so that the controller can easily execute various image processings on the contents of image memories 2-1, 2-2 and video frame memory 1-1. Also, the mapping of the graphics generator 3 and the image display unit 1 is conducted through said VME bus.

The IMAGE bus 8 is a synchronized bus capable of supporting an address space of sufficient address width (12 bits each for X, Y) and 32 bits for the data width. Said bus is used by the graphics generator 3 and the address calculating unit 4 shown in FIG. 1 for reading and writing of image data.

The SERIAL bus 9 is a synchronized bus having a data width of 32 bits and certain control signal lines, and is connected, exclusively for high-speed image data transfer, to the image memories 2-1, 2-2 and the video frame memory 1-1. Said bus can also be used for data transfer to a high precision scanner/printer such as a color laser printer.

By means of said SERIAL bus 9, the high precision scanner/printer, such as the color laser printer can be connected to a large-capacity memory 5 the image memories 2-1, 2-2 shown in FIG. 1, through an interface board.

The address calculation unit 4 shown in FIG. 1 is connected to the VEM bus 7 and the IMAGE bus 8 in the case of random input and output, and effects high-speed pipeline processing such as image enlargement, reduction, displacement or rotation.

Also, in the case of raster input and output, it can be connected to the IMAGE bus 8 and the SERIAL bus 9.

The connection with the aforementioned controller (computer system) 20 is achieved by connecting the VME bus of said system with the VME bus 7 of the present system by a bus extension board 22, as shown in FIG. 3. Said bus extension board performs extension on all the lines of the VME bus 7. Thus the present system, though being in a separate housing, can be considered logically as a part of a single computer system (image work station). Said bus extension board 22 is provided with means for disconnecting the bus between the present system and the controller 20, in a case where said address calculating unit 4 uses the VME bus 7.

If the address calculating unit 4 is not used, it is also possible to incorporate the present system in the housing of the controller (computer system) 20, without a bus extension.

The present system is also provided with the graphics generator 3 shown in FIG. 1, which executes image commands in interpreter format.

The image memories 2-1, 2-2 are image data memories, each having a capacity of 2048×2048 pixels×32 bits. The structure of 32 bits in depth direction is shown in FIG. 4.

Figure 4:
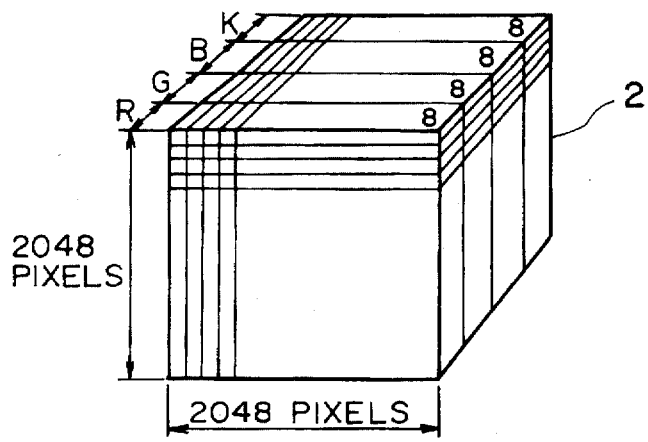
FIG. 4 is a view showing the structure of an image memory IM.

As shown in FIG. 4, each pixel of 32 bits is composed of red R, green G, blue B and black K data of 8 bits each, stored in the order of increasing address. The black (K) field can be utilized as a field of VME function codes (particularly image synthesis codes) as will be explained later.

Also, these image memories have a function of write protection for every bit or every 8 bits. This enables image data writing in each color field.

In the following is explained the selecting method of three buses (VME 7, IMAGE 8, SERIAL 9). The image memory cannot make access to the three buses simultaneously, but has to make selection. More specifically, if the image memory is composed of a single-port DRAM, it has to select one of the three buses. If the image memory is composed of a dual-port RAM, the SERIAL bus 9 is constantly available for image data transfer by the high-speed serial port, and the image memory selects either the VME bus 7 or the IMAGE bus 8.

The SERIAL bus 9 enables high-speed image data transfer.

The access through the VME bus 7 can be made according to the aforementioned memory structure.

The video frame memory 1-1 provided in the image display unit 1 is composed of two planes of monitor display memories, each 2048×2048 pixels×32 bits to enable interactive synthesis of two image planes. The structure of the video frame memory 1-1 is shown in FIG. 5.

Figure 5:
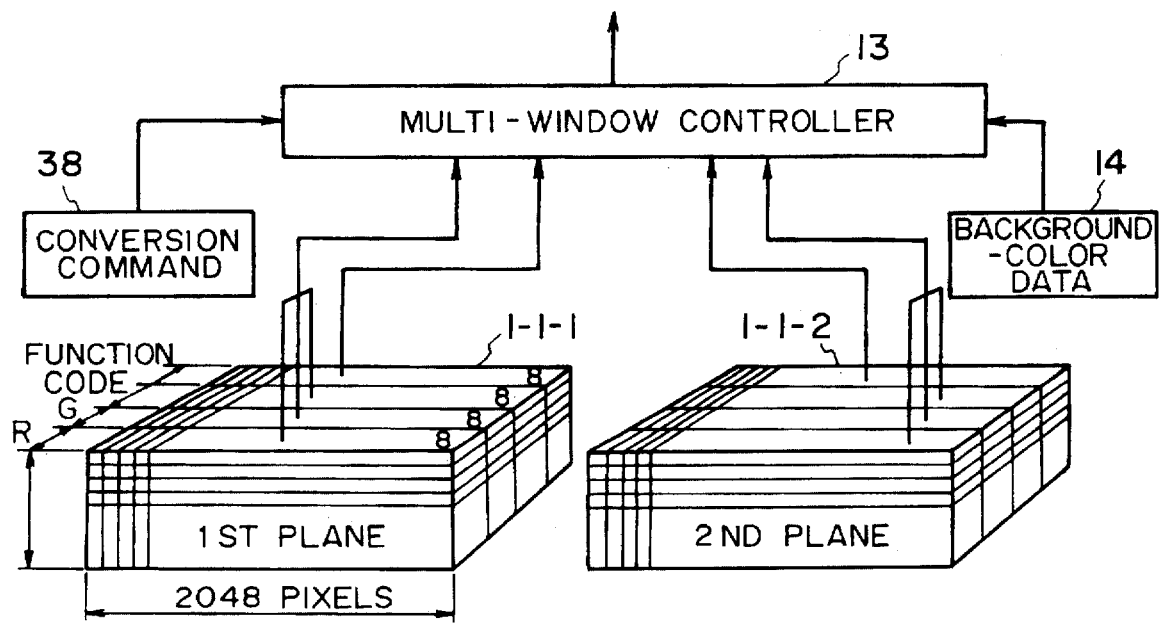
FIG. 5 is a view showing the structure of a memory VFM.

As shown in FIG. 5, the structure of 32 bits in the depth direction of the video frame memory 1-1 is the same as that of the image memory, and is composed of red, green and blue data of 8 bits each and function codes of 8 bits. Also, the address mapping mode is the same. Various syntheses of two image frames can be achieved on a real-time basis by setting background data 14 (24-bit data) and conversion commands as will be explained later by operating an image synthesis mask information field in the function code field and utilizing the function of the multi-window controller 13 of the image display unit 1.

The background data are composed of red, green and blue data of 8 bits each, like the image data of the image memories and the video frame memory, and one kind of such background data can be set.

The conversion command executes a process such as setting of display priority, selection of logic processing or addition of look-up table information, to the function code entered into the multi-window controller 13.

The video frame memory 1-1 is further provided with a function of setting the start address for monitor display independently in two planes, thereby enabling instantaneously change of the layout of two planes.

In the following there will be explained the method of selecting three buses (VME 7, IMAGE 8, SERIAL 9).

The video frame memory 1-1 is composed of a dual-port RAM of which the high-speed serial port is used for supply to the multi-window controller 13, so that the random port is used for said three buses. For this reason, it is unable to use three buses simultaneously, as in the image memories 2-1, 2-2, and has to select a bus.

In a transfer function utilizing the SERIAL bus 9, the video frame memory 1-1 has a function of separating the space of 2048×1024 pixels into two spaces of 1024×1024 pixels each and transferring image data into each of said space. Because of this function, the video frame memory 1-1 alone can be considered to have four spaces of 1024×1024 pixels, so that there can be realized a minimum structure of the present system having the video frame memory 1-1 only, without the image memories 2-1, 2-2. The access to the video frame memory 1-1 from the SERIAL bus 9 is read/write functions.

The access from the VME bus 7 can be made according to the aforementioned memory structure of 2048×1024 pixels×32 bits×2 planes.

The access from the IMAGE bus 8 is made as a memory having X, Y-address space of 2048×1024 pixels.

The multi-window controller 13 receives the image data and the background data 14 from the video frame memory 1-1, executes a synthesis process according to the function codes and conversion codes, and sends the synthesized final image (1280×1024 pixels) to the monitor 6 via a LUT and D/A converter 11.

The function code has 8 bits for each pixel, and enables synthesis for each bit by operating a display mask bit for each pixel.

The conversion code, in the minimum system structure, only has a function of setting the display priority. The user may later add arbitrary conversion codes, such as interpixel logic processing, conversion of pixel value, arithmetic calculation and look-up table control information.

Figure 2:
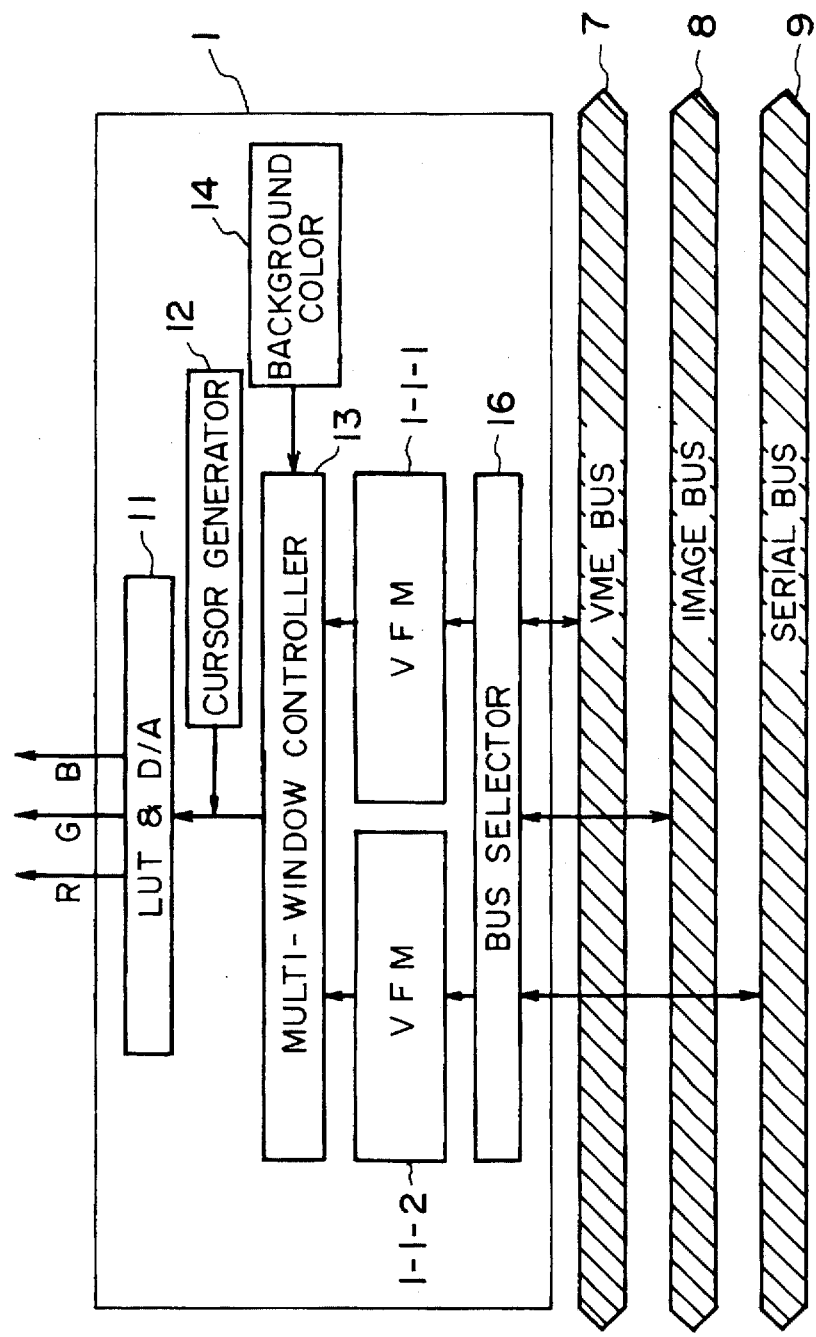
FIG. 2 is a block diagram of an image display unit.

Now reference is made to FIG. 2 for explaining the image display unit 1 including the above-explained video frame memory 1-1 and multi-window controller. The image display unit 1 is equipped with two sets of the video frame memory 1-1, a multi-window controller 13, a cursor generator 12, a look-up cable 11, a bus selector 16 and is capable of intelligent display.

In the illustrated embodiment, the video frame memory 1-1 has a capacity of 2048×1024 pixels×32 bits. Out of the depth of 32 bits, 24 bits are composed of red, green and blue data of 8 bits each, while the remaining 8 bits are used for window information, such as image synthesis information or look-up table information serving as a function code. The multi-window controller 13 receives the image information, function codes etc, from said video frame memory 1-1 and generates an image. The cursor generator 12 superimposes a cursor on the final image, which is converted into monitor signals of 1280×1024 pixels by a final look-up table and D/A converter 11.

The multi-window controller 13 synthesizes and displays two video frame memories 1-1-1, 1-1-2 and the background color 14. A display priority is set for the superposition of the video frame memories, so that the priority relationship of two images can be instantaneously switched. Also, there is provided a function of easily changing the layout of two frames. It is furthermore possible to set a function code for each pixel, so that various processings and syntheses can be conducted on a real-time basis.

Also a look-up table of 8 bits is incorporated for each color in the look-up table-D/A converter 11 to enable gamma conversion, binary digitization or pseudo-color-image-formation for each color.

The cursor generator 12 is capable of displaying a cross hairline cursor or a graphic cursor. The user can prepare a graphic cursor of n'×m' pixels. Also there are functions of cursor color designation and logic processing (AND, OR, XOR, etc.) with the background image.

The video frame memory 1-1 has a function of write protection for every bit or every 8 bits in the 32 bits in the depth direction. This function enables data writing in a specified bit field only, and is available for three buses.

This function enables high-speed transfer, with the SERIAL bus 9, of image data stored in frame-serial manner (in the large-capacity memory shown in FIG. 1), or data writing only in the function code data field of the video frame memory by means of the graphics generator.

The multi-window controller 13 displays an image of 1280 (dots)×1024 (lines) out of the image data of two video frame memories 1-1 composed of 2K×1K×32 bits. In image display, it has the function of synthesizing the data of the video frame memories 1-1-1 and 1-1-2, by using the image synthesis mask in the function code. Also various logic processings are conducted according to the content of a conversion command register 38 (cf., FIGS. 5 and 6) supplied externally.

Figure 6:
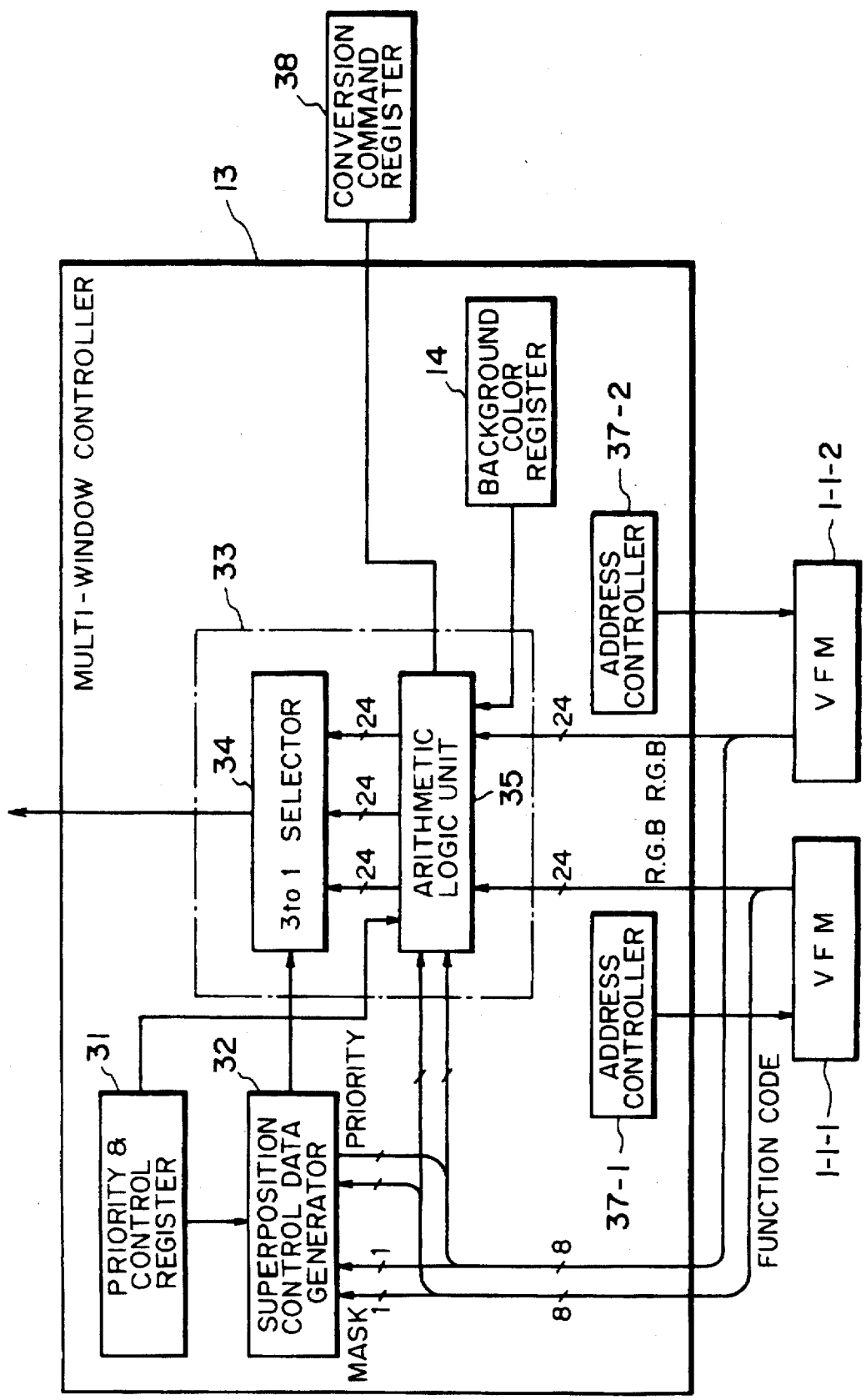
FIG. 6 is a block diagram of a multi-window controller.

FIG. 6 is a block diagram showing different blocks of the multi-window controller, and said blocks will be explained in the following.

There are provided two address controllers 37, which respectively provide the serial ports of the video frame memories 1-1-1, 1-1-2 with addresses for data reading. The controller CPU 20 can make access to said address controllers for arbitrarily setting the start address. The superimposed image obtained from two image frames can be moved to an arbitrary position, on a real-time basis, by giving different start addresses to the video frame memories 1-1-1 and 1-1-2.

A display priority and control register 31 can, firstly, set the display priority, to be given to either of two images of the video frame memories 1-1-1 and 1-1-2 in the superposition. It is also possible to display only one of the images of the video frame memories 1-1-1, 1-1-2. Said register 31 can furthermore select a state of "disregarding the priority entered into the superimpose control circuit", or "disregarding the input of conversion command register in the arithmetic logic unit". In addition to the superposition of two images, it is possible to superimpose binary images.

Figure 7:
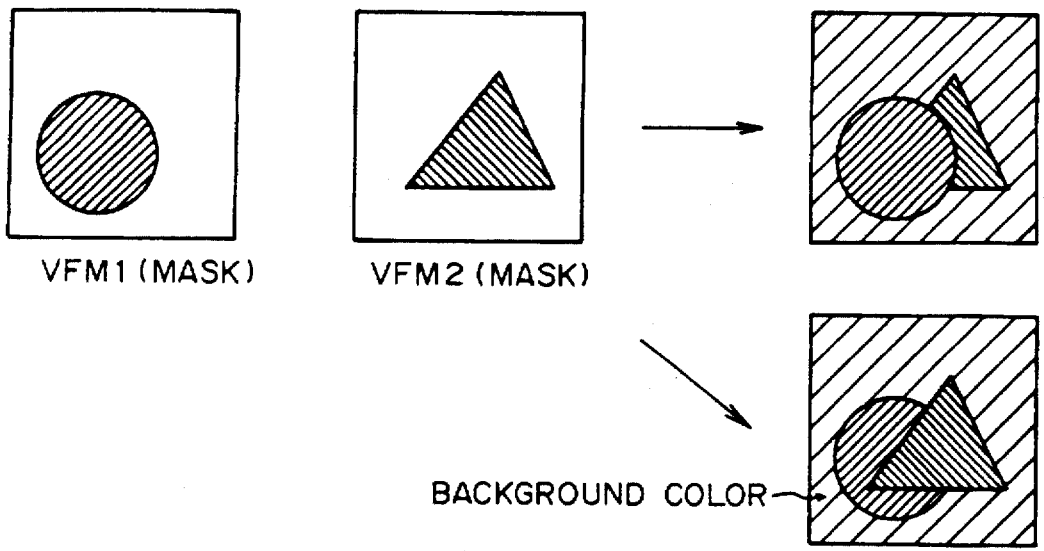
FIG. 7 is a schematic view showing the concept of superimposition of two images.

In the following there will be explained the function of a superposition control data generator 32. FIG. 7 shows the concept of superposition of two image planes. The superposition control data generator 32 receives the display priority and the masks of two image planes of the video frame memories, and sets data in a display priority and control register 31. The upper right view and bottom right view in FIG. 7 show the results of variation in the display priority.

In practice, a selection signal, for selecting the data of the video frame memory 1-1-1, those of the video frame memory 1-1-2 or the background color 14, is supplied to a 3-to-1 selector 34 for each pixel. Said selection signal is prepared by:

1) according to the mask bit in the function code and the value set in the display priority and control register 31, or 2) according to the mask bit and priority bit of the function code, said priority bit being entered and changeable for each pixel.

In case a bit in the priority bit of the function code is used as a bit plane for a binary image such as a character image or a computer graphic image, the superposition control data generator 32 supplies, referring to said binary-image bit plane, the 3-to-1 selector 34 with a selection signal to "forcedly select the background color register", whereby binary images of two planes can be superimposed further on the two superimposed images.

The conversion command register 38 provides the arithmetic logic unit 35 with data required for logic calculation between two planes of the video frame memories 1-1-1 and 1-1-2 or between the data of a video frame memory and said register 38.

The arithmetic logic unit 35 executes logic calculations between the two planes of the video frame memories or logic calculations on the data supplied to the conversion command register 38, with necessary functions such as logic summing, logic multiplication, exclusive logic calculations etc.

If an instruction "to disregard the data of the conversion command register" is given from the display priority and control register 31, the above-mentioned logic calculations are conducted utilizing plural bit planes of the function code of the video frame memories 1-1, instead of the commands of the conversion command register 38, whereby the logic calculation can be varied for each pixel.

The 3-to-1 selector 34 selects and releases, for each pixel, either the data of the video frame memories 1-1 subjected to logic calculations in the arithmetic logic unit 35, or the data of the background register 14, based on the selection signal prepared by the superposition control data generater 32.

Thus the multi-window controller 13 is easily capable of superposition of the image data of two planes of the video frame memories 1-1, superposition of binary images and layout modification.

The present system is provided, as shown in FIG. 1, with the serial bus 9 exclusive for high-speed image data transfer between an image memory and the video frame memory or between the image memories.

The image data transfer can be conducted in (1) a same size mode, (2) a reduction mode or (3) a pregressive mode, which will be explained in the following.

1) Same size mode:

In this mode, a rectangular area of the source is transferred in rasters with no change in size to a rectangular area of the destination.

2) Reduction mode:

In this mode, the image plane of an image memory of the source is transferred in rasters, and with a reduction rate of ¼ or ¹⁄₁₆, to an area of 1024×1024 pixels of the destination.

This mode is used for displaying the entire image of an image memory on the monitor 6.

3) Progressive mode:

In this mode, data transfer in the same size mode or reduction mode is conducted in a progressive manner, in order to enable a quick over-view of the entire image.

This mode is effective in the case of image data transfer from the image memory to the video frame memory for display on the monitor 6.

These three image transfers will be explained in more detail in the following.

The high-speed transfer of image data is conducted through the serial bus 9, consisting of lines for data, a synchronization signal and certain control signals. In the high-speed image data transfer, since the serial bus 9 lacks the address line, the addresses are supplied to the RAM from address generators 2-1a, 2-2a, 1-1a provided in the image memories and the video frame memories 1-1. A synchronization signal is provided in the serial bus 9, in order to synchronize the timing of address generation at the data transmitting side (master) with that of the data receiving side (slave).

The transfer between the image memories 2-1 and 2-2 is conducted either in (1) the same size mode or (2) the reduction mode. In this case the high-speed transfer of image data is conducted by the serial bus 9. One of the image memories connected to the serial bus 9 functions as the master for sending the image data.

Also among plural image memories connected to the serial bus 9, one or plural image memories function as a slave for fetching the data on the serial bus 9. The timing of master-slave high-speed data transfer is controlled by the transfer synchronization signal on the serial bus 9.

Figure 8:
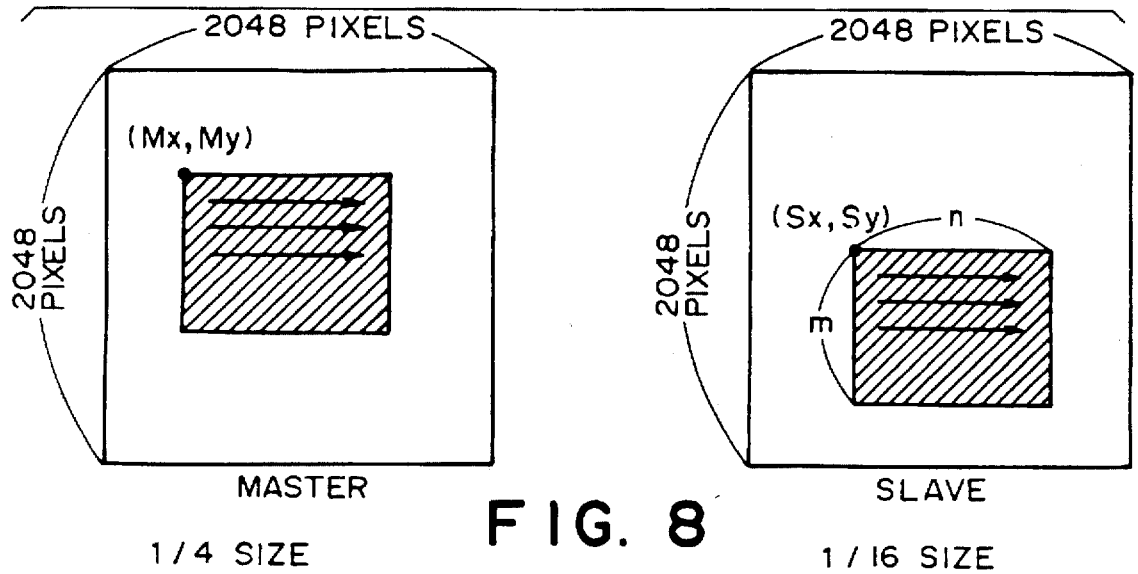
FIG. 8 is a schematic view showing the principle of image transfer.

1) Same size mode:

FIG. 8 illustrates the data transfer between image memories. In the master image memory, there are set the same size mode and the coordinate (Mx, My) of the upper left point of the rectangular area, whereby the transfer of said rectangular area is conducted. The transfer is conducted in the unit of each horizontal line in synchronization with a horizontal synchronization signal, and the image data in each horizontal line are transferred in the increasing order of addresses by pixel synchronization pixels.

In the slave image memory, there are set the same size mode, the coordinate (Sx, Sy) to the upper left corner point of the rectangular area, and lengths n, m in the horizontal and vertical directions, whereby the data of a rectangular area of n×m pixels are fetched, out of the data transferred from the master side. The image data on the serial bus 9 are fetched, in the horizontal direction, over n pixels in each line in synchronization with the horizontal synchronization signals, and, in the vertical direction, over m lines. In each horizontal line, the image data are fetched pixel by pixel, in synchronization with the pixel synchronization signal.

In the high-speed image transfer, the master image memory and the slave image memory are connected to the serial bus 9.

Figure 9A:
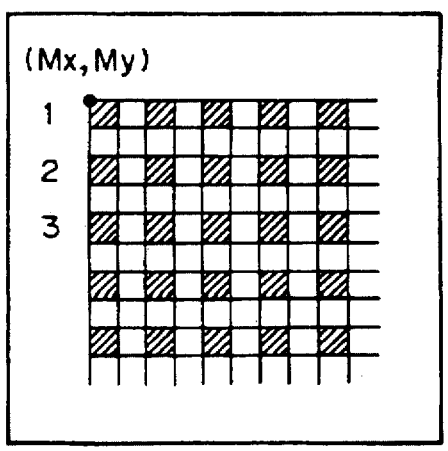
FIGS. 9(a) and 9(b) are schematic views showing the principle of image transfer in reduction mode.
Figure 9B:
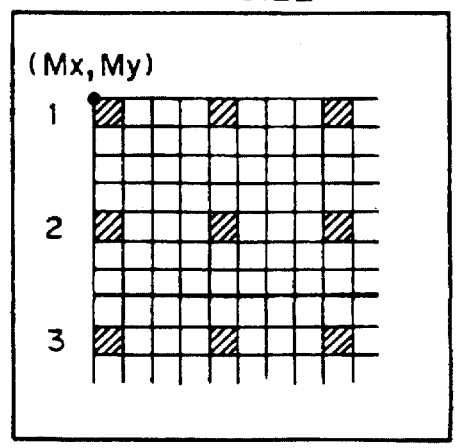

2) Reduction mode:

As in the same size mode, the master image memory and slave image memory are connected to the serial bus 9. In the master image memory there are set the reduction mode with a reduction (area) ratio of ¼ or ¹⁄₁₆. Also as in the same size mode, the coordinate (Mx, My) of the upper left corner point of the rectangular area to be transferred is set, thereby the image data in said rectangular area are transferred in succession with skipping. As shown in FIG. 9, in the reduction to ¼, every other pixel is skipped in the horizontal and vertical directions, so that only the hatched pixels are transferred. In the reduction to ¹⁄₁₆, three out of every consecutive four pixels are skipped in the vertical and horizontal directions, whereby the pixels hatched in FIG. 8 are transferred. Thus the hatched pixels in each horizontal line are transferred in succession to the serial bus 9 in synchronization with the pixel synchronization signals, and, in the vertical direction, horizontal lines (1), (2), (3), ... are transferred in synchronization with the horizontal synchronizaiton signals.

In the slave image memory, there is set a rectangular area of a size of n×m pixels, having a corner point (Sx, Sy) with the same size mode.

By the above-explained settings of the master and the slave, the skipped image data transferred from the master are fetched in the slave to obtain a reduced image.

In the image transfer between the image memory and the video frame memory, there can be selected (1) the same size mode, (2) the reduction mode or (3) the progressive mode, and the image memory and the video frame memory are connected to the serial bus 9 at the image data transfer.

As the video frame memory 1-1 has two planes of 2K×1K pixels each on a same board, the serial bus 9s is connected to either plane for conducting the image transfer.

The image transfer in the (1) same size mode or (2) reduction mode is conducted in a similar manner as in the high-speed image transfer between the image memories, and will not be explained further.

In the progressive mode, the master image memory does not send the image data of the rectangular image area in consecutive manner from an end thereof, but transfers skipped images in plural times to the video frame memory 1-1. Thus the image of a high resolution is built up in the video frame memory 1-1 in a progressive manner.

Also, in said progressive transfer mode, there can be selected (1) the same size mode or (2) the reduction mode. In the same size mode, the master image memory transfers, at first, the pixels marked as "1" shown in FIG. 10(a) line by line. The pixels "2", "3" and "4" are transferred in a similar manner in later cycles.

Also, in the reduction mode, as shown in FIG. 10(b), the pixels "1" are transferred at first, and the pixels "2", "3" and "4" are transferred later in succession.

In the progressive mode, the slave video frame memory 1-1 sets an arbitrary position (Sx, Sy) as the end point of the rectangular area, and the slave video frame memory fetches the data in the pixel positions "1" shown in FIGS. 10(a) or (b) when the master image memory transfers the pixels "1". In this manner the slave unit fetches the data at the pixel positions corresponding to those of the image data transferred from the master unit.

Both in the same size mode and in the reduction mode, the slave video frame memory 1-1 is always set at the same size mode as shown in FIG. 10(a).

In the progressive mode, the video frame memory 1-1 provides displays on the monitor 6 as shown in FIG. 11 until the completion of the image data transfer, since the transfer rate from the image memory to the video frame memory 1-1 is lower than the output rate from the video frame memory 1-1 to the monitor.

This operation will be explained more detailedly in the following. When the pixels "1" of the image memory shown in FIG. 10(a) or (b) are all transferred to the pixel "1" of the video frame memory 1-1 shown in FIG. 10(a), the data "A1, B1, C1, D1" in the pixels "1" are repeatedly supplied four times from the video frame memory to the monitor for display thereon as shown in FIG. 11(A). Then the pixels "2" of the image memory shown in FIGS. 10(a) or (b) are transferred to the pixels "2" of the video frame memory shown in FIG. 10(a). Until the completion of said transfer, the video frame memory continues to send the data of the pixels "1" to the monitor. Upon completion of said transfer, the video frame memory 1-1 sends every line twice as shown in FIG. 11(B). Then, when the transfer is completed up to the pixels "3", the output of the video frame memory 1-1 varies as shown in FIG. 11(C).

Finally, when all the pixels "1" to "4" are transferred, all the image on the video frame memory is read in succession to display a complete image on the monitor 6.

In the high-speed image transfer explained above, the image memory is composed of a single-port RAM.

In this case, in the high-speed image transfer, for connecting the data line of the RAM with the serial bus 9, the image memories 2 are disconnected from the VME bus 7 and the image bus 8 so that the access from the CPU or the graphics processor is not possible. On the other hand, during image processing by access from the CPU or the graphics processor 3, the high-speed image transfer is not possible so that the interim result of processing cannot be monitored.

However, in the case where the image memory is composed of a dual-port RAM, the high-speed serial port is always connected to the serial bus 9 while the random port is selectively connected to the VME bus 7 or the image bus 8. Thus the use of a dual-port RAM enables access to the image memory through the VME bus 7 or the image bus 8, whereby the result of processing, even in the course thereof, can be transferred at a high speed to the video frame memory 1-1 through the serial bus 9 and can be confirmed on the monitor. Also, the efficiency of processing is improved as the processing in the CPU or the graphics processor is not hindered.

The image memory and the video frame memory 1-1 have a function of write protection in the high-speed image transfer as follows:

(1) At the high-speed image transfer, the image memory or the video frame memory 1-1 of the slave side has a function of write protection in each bit, in the image data of 32 bits transferred from the master side. This function enables the transfer of image data in each color field, or data transfer of the function code only. However the image memory of the master side has to send all the 32 bits.

(2) In addition the image memory or the video frame memory of the slave side has a function of write protection on all the 32 bits transferred from the master image memory, on each pixel, by referring to the image synthesis mask bit in the function code contained in said 32 bits.

(3) The function (2) enables the superposition of an image of a form indicated by the image synthesis mask bit, by repeating the transfer from the image memory to the image memory, or from the image memory to the video frame memory, without limitation in the number of images to be superimposed.

Figure 12:
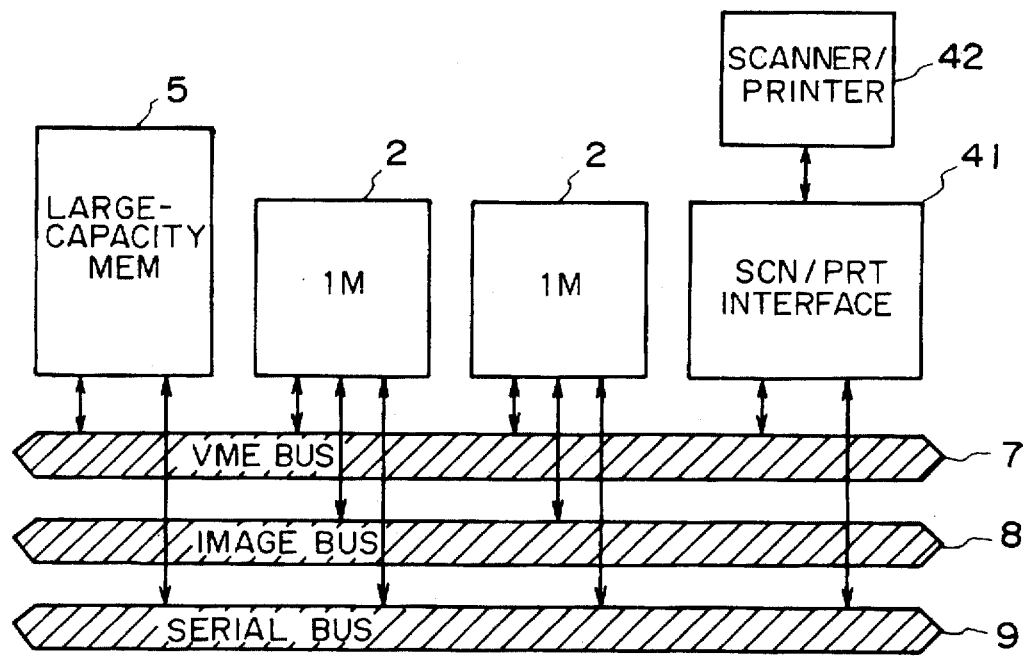
FIG. 12 is a block diagram showing the connection between a serial bus and a scanner/printer.

As shown in FIG. 12, the large-capacity memory and the image memories are connected to a scanner/printer interface 41 through the serial bus 9 for the high-speed image transfer, and satisfy the timing for high-speed image transfer to the video frame memory 1-1, and the timing for image transfer to the scanner/printer interface 41. Said timing can be switched by varying the synchronization on the serial bus 9. The image transfer from the image memories or the large-capacity memory 5 to the scanner/printer 42 is conducted in the page mode for a high-speed scanner or printer, but in the normal mode for other scanners or printers.

Figure 13:
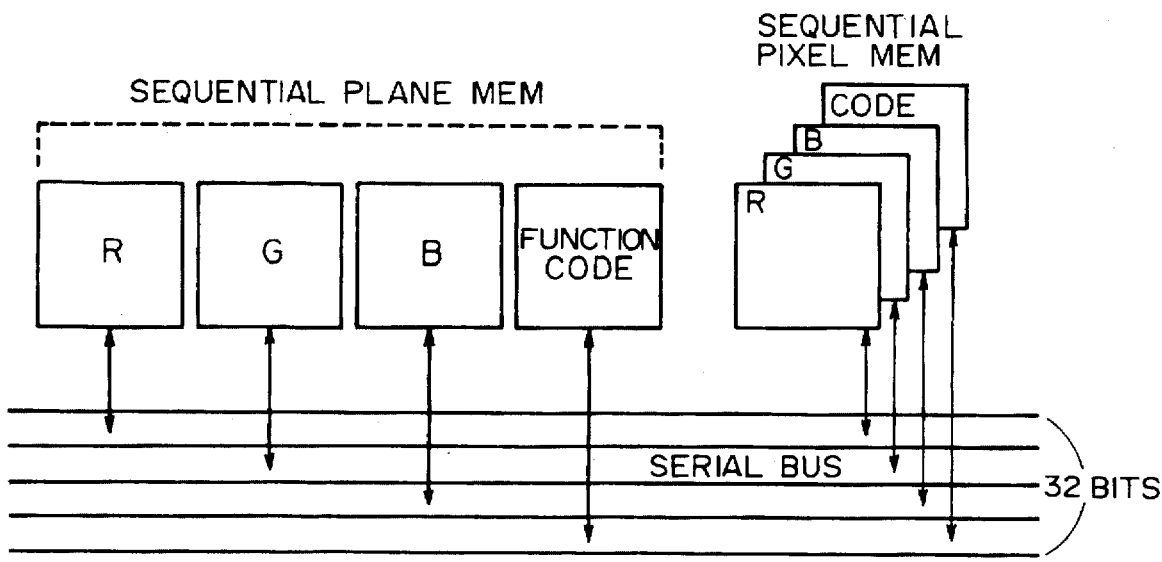
FIG. 13 is a schematic view showing the transfer between a frame-sequential memory and a pixel-sequential memory.

In the following there will be explained the high-speed image transfer when the data structure is different between the master side and the slave side. FIG. 13 shows the principle of transfer between a plane-sequential memory and a pixel-sequential memory. In the high-speed image transfer, the image memory or the video frame memory of the slave side has a function of write protection for each bit, and this function enables image transfer even from a master memory of a different data structure. In the foregoing explanation, it is assumed that the image memories and the video frame memory 1-1 are pixel-sequential memories, and that a pixel of 32 bits contains color component data of red, green and blue components and is transferred at the same time.

In the following there will be explained the transfer in a case where a pixel in the memory is composed of a single color component (plane-sequential memory).

(1) Transfer from plane-sequential memory to pixel-sequential memory

Figure 14:
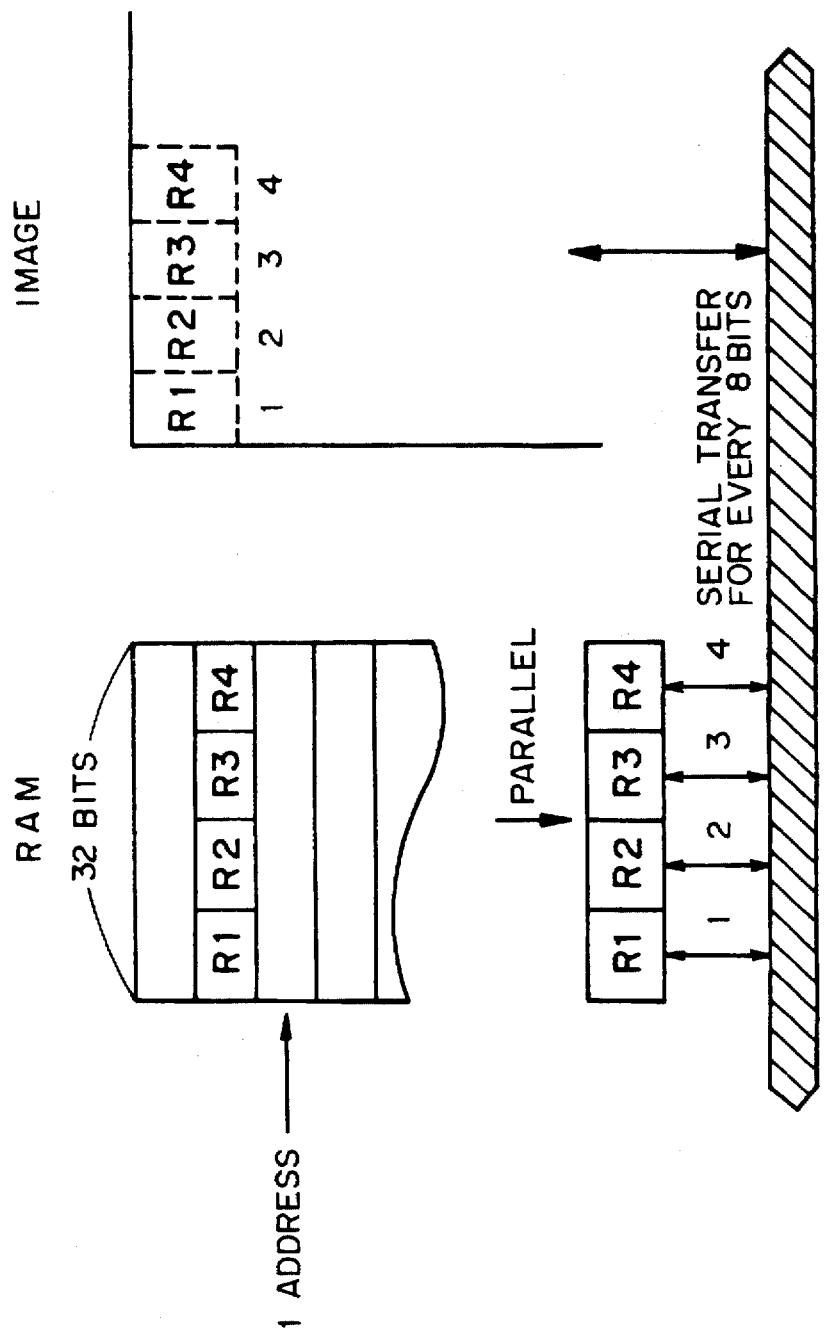
FIG. 14 is a schematic view showing the read-write operation of the memory in a serial transfer.

As shown in FIG. 14, the plane-sequential memory of the master side stores data of a pixel or plural pixels in an address of the RAM. The image transfer is conducted in the same manner as in the pixel-sequential memory, except that the plural pixels read from an address of the plane-sequential memory are subjected to parallel-to-serial conversion.

For example, if an address of the RAM constituting the plane-sequential memory is composed of 4 bytes (R1, R2, R3, R4) as shown in FIG. 14, the data are subjected to a parallel-to-serial conversion to enable transfer in the form of continuous data of 1 byte each. Then the transfer is conducted by selecting (1) the same size mode, (2) the reduction mode, or (3) the progressive mode as in the pixel-sequential memory. In this case, however, the master memory is connected to a bus of 1-byte width corresponding to the property (R, G, B function code) of the plane-sequential memory, among the width of 4 bytes of the serial bus 9.

The pixel-sequential memory of the slave side selects the same size mode or the same size mode in the progressive mode, and writes the data transferred from the master, into the predetermined bits. In this operation, the write-protect function is utilized to prevent data writing in other bits. Since the serial bus 9 is connected to the plane-sequential memories of different properties, simultaneously image transfers from four plane-sequential memories as the master. In this case no write-protect function is needed in the pixel-sequential memories of the slave side.

Even in such image transfer from a memory of different data structure, the image can be displayed on the monitor if the video frame memory is used as the slave.

(2) Transfer from pixel-sequential memory to plane-sequential memory

The pixel-sequential memory of the master side effects the image transfer in usual manner in (1) the same size mode, (2) the reduction mode, or (3) the progressive mode, regardless of the data structure of the slave side.

The plane-sequential memories are switched according to the transferred data, to achieve high-speed image transfer.

As shown in FIG. 13, the plane-sequential memories of the slave side are respectively connected, according to the categories (R, G, B, function code) to the data buses of corresponding categories in the serial bus 9. If the plane-sequential memory has a structure of four pixels for an address as shown in FIG. 14, the image data transferred through the serial bus 9 are subjected to a serial-to-parallel conversion in every four bytes and fetched in the RAM. As in the case of pixel-sequential memory, the slave side has the same size mode only.

The plane-sequential memories of the slave side may be provided in any number. For example, if four plane-sequential memories are connected to the buses of different categories (R, G, B, function code) in the serial bus 9, a transfer from a master pixel-sequential memory completes data transfer into said four plane-sequential memories. Also if two or more plane-sequential memories are connected to a data bus of a same category in the serial bus 9, the image data on the serial bus 9 can be fetched in plural memories of a same category.

Figures 15, 16:
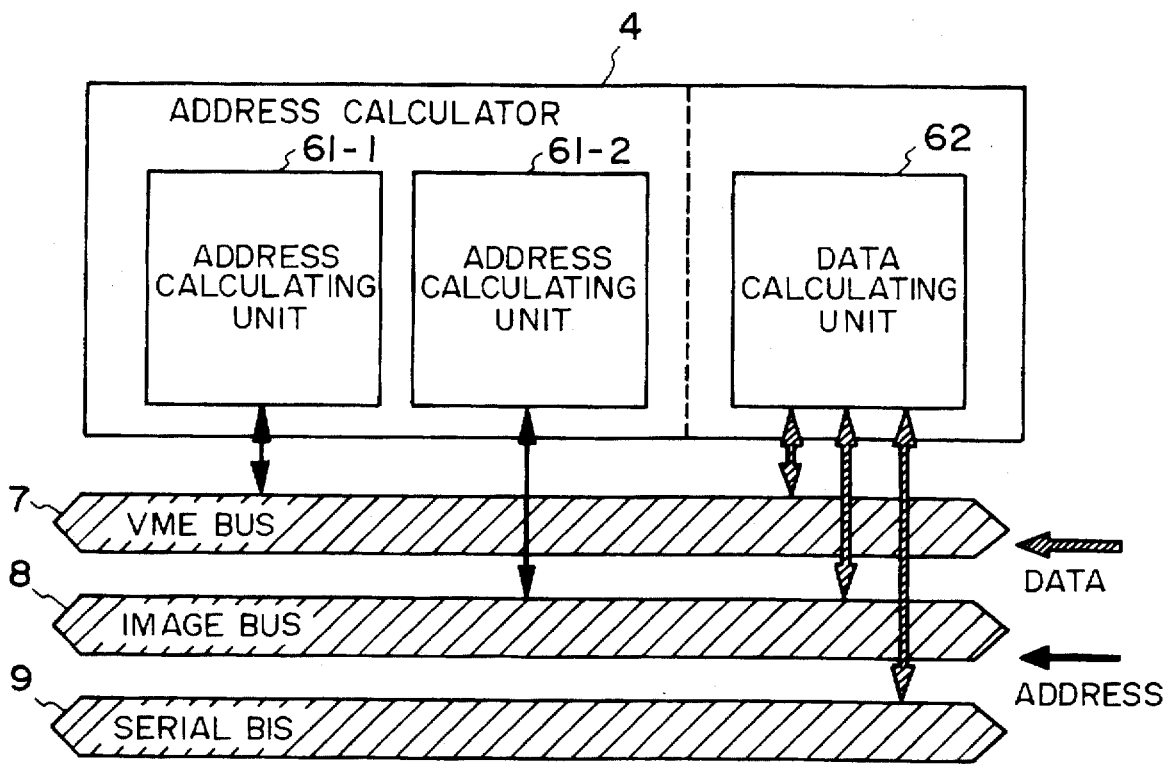
FIG. 15 is a block diagram of an address calculating unit.
FIG. 16 shows the processes of the address calculator 4.

The address calculator 4 in FIG. 1 is connected, as shown in FIG. 15, to the VME bus 7, image bus 8 and serial bus 9.

Usually it is connected to two buses, one of which is used for input to the address calculator 4, while the other is used for output therefor. A data calculator 62 in the address calculator normally do not execute any process, thus releasing the input data. However, if an interpolation or other various pixel calculation (spatial filtering, addition, multiplication, color conversion, etc.), the data calculator 62 functions as a pipeline processor, and the delay in such processing is absorbed between two address calculators 61-1 and 61-2.

(1) Connection to VME bus 7 and image bus 8

In a case where the address calculator 4 is connected to the VME bus 7 and the image bus 8, said buses are respectively connected to the address calculator units 61-1, 61-2 as said buses have address lines. Also, said buses are respectively connected to different image memories or video frame memory, one of which constitutes a source memory while the other constitutes a destination memory. The source memory may be the one connected to the VME bus 7 or the one connected to the image memory bus 8. The two address calculators 61-1, 61-2 supply addresses to the source and destination memories. According to the source addresses the image data are entered into the data calculator 62, and, according to the destination addresses the result of calculation is stored in the destination memory. FIG. 16 shows the address calculations and the data calculations.

In this mode, since the VME bus is occupied, the present system is disconnected, by the aforementioned bus extension board 22, from the CPU 22.

(2) Connection to image bus and serial bus

If the VME bus 7 is used for example by the CPU of the controller 20 for special address calculations as explained in (a) or (b) in the following, the address calculator can be operated without disconnecting the VME bus 7 from the VME bus of the controller. In such case, the address calculator is connected to the image bus 8 and the serial bus 9, and the VME bus 7 is freely usable by the CPU of the controller 20.

(a) When the addresses of the data entered into the data calculator 62 are random, and the addresses of the output of the data calculator 62 are raster-sequential; or (B) When the addresses of the data entered into the data calculator 62 are raster-sequential, and the addresses of the output of the data calculator 62 are random.

In these conditions, a memory of raster-sequential access is connected to the serial bus 9, while the other memory of random access is connected to the image bus 8. Though the serial bus is solely composed of data lines and lacks the address line, but is capable of raster-sequential input and output by the address generators provided in the image memories and the video frame memory.

(3) Other functions of address calculator 4

(1) The address calculator 4 enables image transfer from the image memory to the video frame memory (selectable is connection to the VME bus 7 and image bus 8, or connection to the image bus 8 and serial bus 9). Though the high-speed image transfer by the serial bus 9 can only select the same size mode or the reduction mode with a reduction area ratio of ¼ or ¹⁄₁₆, the address calculator can effect the image transfer with an arbitrary image magnification.

(2) In addition high-quality data transfer is possible with reduced image quality deterioration, by the interpolation in the data calculator 62.

(3) The calculating function of the address calculator 61 allows to rearrange the pixels at the image transfer to the video frame memory and to display the image on the monitor 6, even if the stored image is arranged one-dimensionally or present in image memories of plural memory boards or in the large-capacity memory 5.

(4) The address calculator 4 is capable of transfer from a plane-sequential memory to a pixel-sequential memory, or from a pixel-sequential memory to a plane-sequential memory, by means of the address calculating function, and the data structure converting function by the data calculator 62.

As explained in the foregoing, the present invention expands the freedom in the processable image size, and enables a high processing speed. Also it enables to improve the operability and the dialogue performance, and to handle various data structures of the memory, with a relatively inexpensive apparatus.

What is claimed is:

1. An image processing system comprising:

a plurality of image memories for storing image data;

display means for displaying image data;

display control means for effecting control for displaying the image data, stored in said plurality of image memories, on said display means;

a system bus connected to each of said plurality of image memories and display control means for transferring image data, address data and control data;

a first image bus connected to each of said plurality of image memories and display control means, for mutually transferring the image data and the address data;

a second image bus connected to each of said plurality of image memories and said display control means for mutual high-speed transfer of the image data, wherein said second image bus transfers the image data in serial; and bus selection means in said display control means for selecting a desired one or more buses from among said system bus, said first image bus and said second image bus and for enabling transfer of the image, address and control data between said plurality of image memories and said display control means via the desired one or more selected bus or buses.

2. An image processing system according to claim 1, wherein said system bus is provided with system bus extension means and is connected to a system bus of a controller for controlling said system bus extension means and said entire system.

3. An image processing system according to claim 1, wherein said second image bus is connected to interface means for a scanner/printer for input or output of the image data, and said input or output is conducted by mutual transfer of the image data by said interface means and said image memories.

4. An image processing system according to claim 1, wherein said display control means comprises plural frame memories therein and is adapted to superimpose image data read from said plural image memories.

5. An image processing system according to claim 1, wherein said system bus and image transfer bus are connected to address calculator means for effecting image processing such as enlargement, reduction, displacement or rotation of the image data.

6. An image processing system according to claim 1, wherein said image memories comprise address generator means for transferring the image data to said second image bus.

7. An image processing apparatus according to claim 1, further comprising image data generating means connected to said system bus and first image bus, and adapted to generate and transfer image data to said image memories.

8. An image processing system comprising:

a plurality of image memories for storing image data;

display means for displaying image data;

display control means for effecting control for displaying the image data, stored in said plurality of image memories, on said display means;

a system bus connected to each of said plurality of image memories and display control means for transferring image data, address data and control data;

a first image bus connected to each of said plurality of image memories and display control means, for transferring the image data and the address data;

a second image bus connected to each of said plurality of image memories and said display control means for mutual high-speed transfer of the image data, wherein said second image bus transfers the image data in serial;

bus selection means in said display control means for selecting a desired one or more buses from among said system bus, said first image bus and said second image bus and for enabling transfer of the image, address and control data between said plurality of image memories and said display control means via the desired one or more selected bus or buses; and control means connected to said system bus for controlling said plurality of image memories, said display means and said display control means to effect image processing.

9. An image processing system according to claim 8, wherein said second image bus is connected to interface means for a scanner/printer for input or output of the image data, and said input or output is conducted by mutual transfer of the image data by said interface means and said image memories.

10. An image processing system according to claim 8, wherein said display control means comprises plural frame memories therein and is adapted to superimpose image data read from said plural image memories.

11. An image processing system according to claim 8, wherein said system bus and first image bus are connected to address calculator means for effecting image processings such as enlargement, reduction, displacement or rotation of the image data.

12. An image processing system according to claim 8, wherein said image memories comprise address generator means for transferring the image data to said second image bus.

13. An image processing system according to claim 8, further comprising image data generating means connected to said system bus and first image bus, and adapted to generate and transfer image data to said image memories.

14. An image processing system having a plurality of image memories for storing image data, display means for displaying image data, display control means for effecting control for displaying the image data, stored in said plurality of image memories, on said display means, and control means for controlling said plurality of image memories, said display means and said display control means, in which said plurality of image memories, said display control means and said control means are connected by a bus line for mutual transfer of image data and address data, said system comprising:

an image bus line connected to each of said plurality of image memories and said display control means for mutual high-speed transfer of the image data, wherein said image bus line transfers the image data in serial; and bus selection means in said display control means for selecting a desired one of said bus line and said image bus line and for enabling transfer of the data between said plurality of image memories and said display control means via the desired one selected bus line, wherein said display control means includes a plurality of frame memories, and further includes means for processing image data stored in said plurality of frame memories.

* * * * *

UNITED STATES PATENT AND TRADEMARK OFFICE
CERTIFICATE OF CORRECTION

PATENT NO. : 5,714,985

DATED : February 3, 1998

INVENTOR(S) : NAOTO KAWAMURA ET AL.

It is certified that error appears in the above-identified patent and that said Letters Patent is hereby corrected as shown below:

COLUMN 1

Line 30, "system" should read --systems--.
    Line 42, "operator." should read --operator for use.--.
    Line 43, "system," should read --systems,--.

COLUMN 2

Line 25, "and" should be deleted.
    Line 38, "bus, 7," should read --bus 7,--.

COLUMN 3

Line 5, "printer" should read --printer,--.
    Line 6, "the" should read --and the--.

COLUMN 4

Line 21, "neously" should read --neous--.
    Line 34, "space." should read --spaces.--.
    Line 66, "cable 11," should read --table 11,--.

COLUMN 5

Line 8, "codes" should read --codes,--.

UNITED STATES PATENT AND TRADEMARK OFFICE
CERTIFICATE OF CORRECTION

PATENT NO. : 5,714,985

DATED : February 3, 1998

INVENTOR(S) : NAOTO KAWAMURA ET AL.

It is certified that error appears in the above-identified patent and that said Letters Patent is hereby corrected as shown below:

COLUMN 6

Line 52, "generater 32." should read --generator 32.--.
    Line 62, "pregressive" should read --progressive--.
    Line 66, "rasters" should read --rasters and--.

COLUMN 7

Line 10, "over-view" should read --overview--.

COLUMN 8

Line 27, "bus 9s" should read --bus 9--.

COLUMN 9

Line 47, "However" should read --However,--.
    Line 62, "memory" should read --memory 5--.

COLUMN 11

Line 19, "do" should read --does--.
    Line 44, "board 22," should read --board 21,--.

UNITED STATES PATENT AND TRADEMARK OFFICE
CERTIFICATE OF CORRECTION

PATENT NO. : 5,714,985

DATED : February 3, 1998

INVENTOR(S) : NAOTO KAWAMURA ET AL.

It is certified that error appears in the above-identified patent and that said Letters Patent is hereby corrected as shown below:

<u>COLUMN 12</u>

Line 27, "Also" should read --Also,--.

Signed and Sealed this

Eleventh Day of August 1998

Attest:

BRUCE LEHMAN

*Attesting Officer*    *Commissioner of Patents and Trademarks*